C. L. JOHNSON.
AMUSEMENT VEHICLE.
APPLICATION FILED DEC. 17, 1919.

1,409,381.

Patented Mar. 14, 1922.
2 SHEETS—SHEET 1.

Inventor
CHARLEY L. JOHNSON
By Richard J. Cook
Attorney

C. L. JOHNSON.
AMUSEMENT VEHICLE.
APPLICATION FILED DEC. 17, 1919.
1,409,381.
Patented Mar. 14, 1922.
2 SHEETS—SHEET 2.
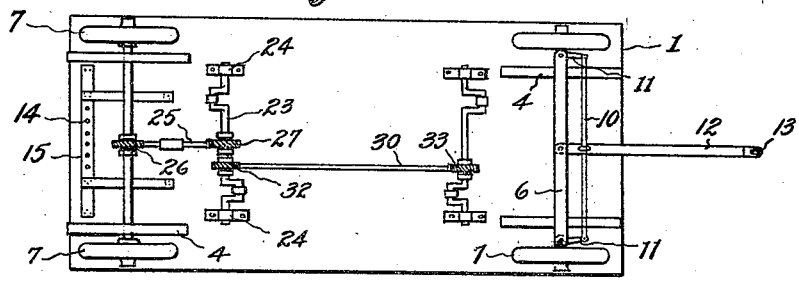
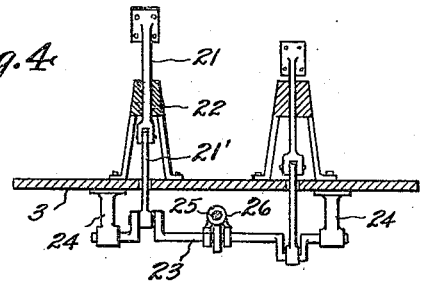
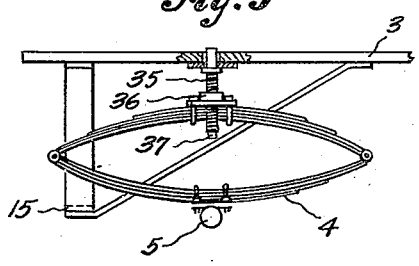
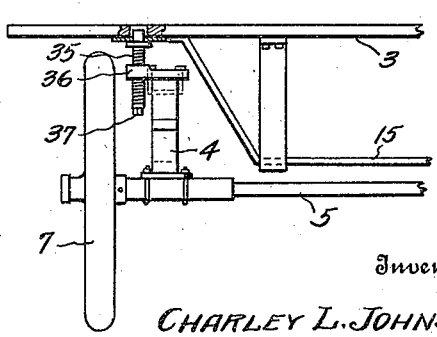
Inventor
CHARLEY L. JOHNSON
By Richard J. Cook
Attorney

UNITED STATES PATENT OFFICE.

CHARLEY L. JOHNSON, OF SEATTLE, WASHINGTON.

AMUSEMENT VEHICLE.

1,409,381. Specification of Letters Patent. Patented Mar. 14, 1922.

Application filed December 17, 1919. Serial No. 345,621.

*To all whom it may concern:*

Be it known that I, CHARLEY L. JOHNSON, a citizen of the United States, and resident of the city of Seattle, county of King, and State of Washington, have invented certain new and useful Improvements in Amusement Vehicles, of which the following is a specification.

My invention relates to amusement devices, and more particularly to improvements in amusement vehicles of a character that are adapted to be drawn entrain over streets or boulevards or which are likewise adapted to be coupled together and operated in merry-go-round formation; the said vehicles to be provided with seats whereon people may ride or to have mounts of various kinds such as the wooden horses and other animals common in merry-go-rounds and which are operated by driving connections with the ground wheels to produce a galloping or other desired motion.

The principal object of the invention is to provide vehicles of the character described, so constructed that they will require no special track to run upon, which may be connected and drawn entrain under the control of a single driver, which may easily be formed and connected operatively in merry-go-round formation and which comprise certain features whereby, when in the latter formation, the outer sides of the vehicles may be raised sufficiently to tilt the vehicle bodies so that they will maintain their balance while traveling rapidly in a small circle.

In accomplishing the objects of the invention, I have provided the improved details of construction, the preferred forms of which are illustrated in the accompanying drawings, wherein—

Fig. 3 is an under side plan view of one of the vehicles.

Fig. 4 is an enlarged, transverse, vertical section, illustrating the mechanism for actuating the mounts.

Fig. 5 is a side view of one of the body springs and its adjustable platform supporting jack.

Fig. 6 is a partial end view of the vehicle.

Figure 1:
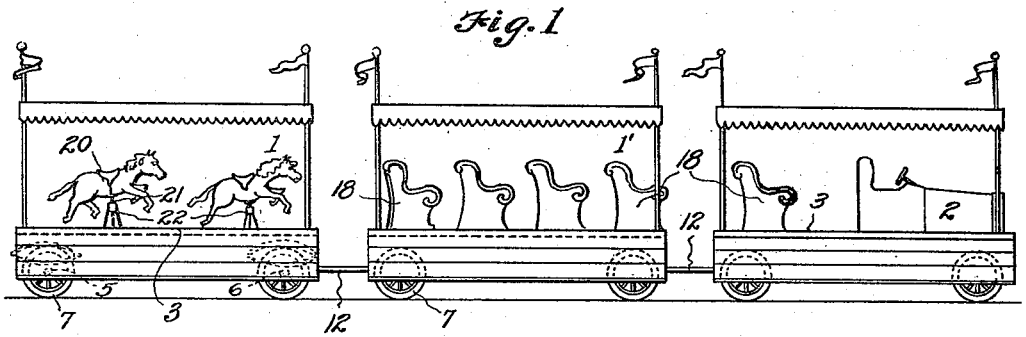
Fig. 1 is a side view of a plurality of amusement vehicles constructed according to the present invention, as drawn entrain.

Referring more in detail to the drawings, wherein like reference numerals designate like parts, 1, 1', 1'', etc., designate similarly constructed vehicles of a four wheeled type which may be connected together in numbers convenient to permit operation without difficulty and which may be drawn by a power propelled vehicle of a type similar to the ordinary automobile truck, as is indicated at 2.

These vehicles may comprise various forms of construction in order to add variety and to attract attention to the same; it being the intention not to limit the vehicles to any particular design either in body formation or in decoration, so long as they do not depart from the spirit of the invention or prevent the objects of the invention to be accomplished.

The type of vehicle most preferred comprises a horizontal platform 3, supported upon springs 4, as shown, at its forward and rearward ends which are fixedly mounted upon axles 5 and 6 at the opposite ends of the vehicle. The axles are equipped with ground wheels 7 which preferably, but not necessarily have pneumatic tires thereon to add to the comfort of riding on the vehicle.

The front wheels of the vehicle are steerably mounted in a manner similar to that in which the front wheels of automobiles are mounted, and are held in parallel relation by means of a cross rod 10 that connects to the steering knuckles 11.

Pivotally fixed to the center of the front axle, and to the cross rod 10, is a tongue 12 whereby the vehicle is to be drawn; the tongues of each vehicle being provided at their ends with hooks 13 adapted to enter any one of a series of apertures 14 in draft bars 15 fixed to the under sides and at the rearward ends of the platforms of all the vehicles.

Upon some of the vehicles I have provided seats 18 and upon others I have provided mounts 20 in the form of wooden horses as are usually found on merry-go-rounds. These horses are supported upon posts 21, vertically slidable in bearings 22 mounted upon the platforms and connected at their lower ends through links 21' with crank shafts 23. The crank shafts are revolubly mounted at their ends in bearings 24 fixed to the under side of the platforms and are driven by means of shafts 25 which are operatively connected through worm gears as shown at 26 and 27 from the vehicle's rear axle; the axle being driven by fixing one of the wheels thereto.

The forward set of horses are actuated by means of a connecting shaft 30 which extend from and is driven by the rear crank shaft 23; the connecting shaft being operatively connected with the crank shafts of both sets of horses by means of worm gears as shown at 32 and 33.

Interposed between the supporting springs and the vehicle platforms are the platform adjusting jacks. These jacks consist of vertically disposed shafts 35 that are threaded through bearing blocks 36 mounted upon the springs and at their ends are pivotally fixed to the platforms. At their lower ends the shafts are provided with wrench heads 37 whereby they may be turned to be adjusted in the bearings to raise or lower one side of the platform so that when traveling in a circle at a fast rate the vehicles will maintain their balance.

Figure 2:
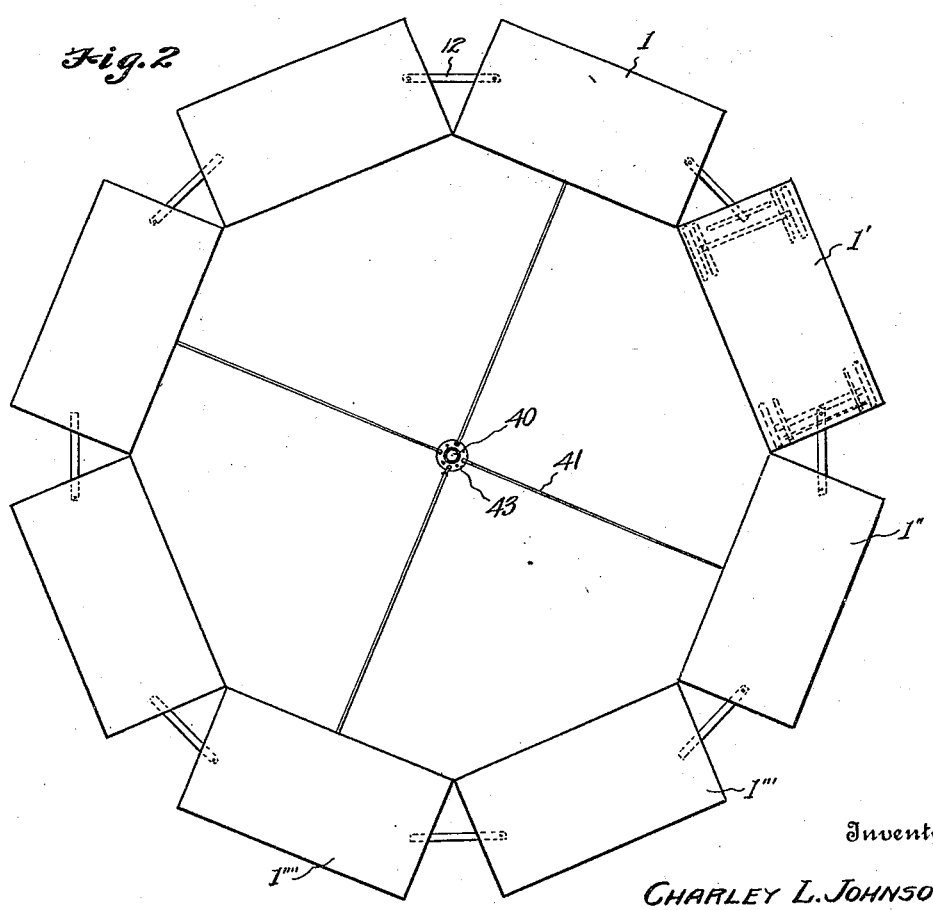
Fig. 2 is a plan view of a plurality of vehicles connected entrain in merry-go-round formation.

When the vehicles are assembled in merry-go-round formation, they may be connected to a fixed center post 40 as shown in Fig. 2 by means of radially extending rods 41 which at their inner ends are fastened to a collar 43 revoluble on the post and at their outer ends are attached to the vehicle platforms, so that there will be no danger of the vehicles upsetting or leaving their course.

It is apparent that vehicles of this character will not be confined to any special route but are adapted to travel over streets and boulevards or assembled in circular formation as described and in either case to be driven by a single power controlled vehicle which may be coupled entrain with the others.

Having thus described my invention, what I claim as new therein and desire to secure by Letters Patent, is—

1. An amusement device comprising a plurality of wheeled vehicles coupled circularly entrain, each vehicle having a tongue at its forward end whereby its front wheels are steered, and having a draft bar fixed transversely to its rearward end; said tongue having a hook at its forward end and said bar having apertures at spaced intervals longitudinally thereof to receive the hook of the following vehicle tongue selectively according to the radius of the circle in which the vehicles operate.

2. An amusement vehicle of the character described comprising running gears, springs mounted on said gears, a seat or mount supporting platform supported by said springs, adjustable members interposed between the springs and platform to effect tilting of the same to one side or the other, a tongue at the forward end of the vehicle for drawing the same, means operable by movement of the tongue to steer the vehicle, and a coupling bar at the rear of the platform for the attachment thereto of the tongue of a similar vehicle drawn entrain.

3. An amusement vehicle adapted to be coupled entrain with similar vehicles comprising a mount supporting platform, axles for supporting the platform and ground wheels at the ends of said axles, crank shafts mounted on the platform, means for driving the said shafts from said axles, mounts operated by said crank shafts and means for adjustably tilting the platform, for the purpose set forth.

4. An amusement device comprising a plurality of wheeled vehicles adapted to be operated entrain about a central fixed post, means for connecting each vehicle with the vehicle forwardly thereof and means operatively connected with said connecting means for steering the vehicle in the path of the preceding vehicle, and connecting rods extending radially from said post to said vehicles to maintain the position of the train about the post.

5. An amusement device comprising a plurality of wheeled vehicles adapted to be operated circularly entrain, each vehicle comprising running gears, a mount supporting platform, a tongue whereby it may be drawn and steered by connection with the preceding vehicle, and means interposed between the running gears and platforms whereby the latter may be adjustably inclined toward the center of the circle accordingly as is required for operation in circles of different sizes and at different speeds.

6. An amusement device comprising a plurality of wheeled vehicles adapted to be operated entrain about a central fixed post, means for connecting each vehicle with the vehicle forwardly thereof and means operatively connected with said connecting means for steering the vehicle in the path of the preceding vehicle, means for adjustably tilting the vehicle bodies inwardly to maintain their balance while moving, a collar revoluble on said post, rods extending from said collar to said vehicles to maintain them about the post, and means in one of said vehicles for propelling the train.

Signed at Seattle, Washington, this 25th day of November, 1919.

CHARLEY L. JOHNSON.